United States Patent
Zuffa

(10) Patent No.: US 6,736,628 B1
(45) Date of Patent: May 18, 2004

(54) DEVICE FOR MANUFACTURING PLASTIC ITEMS PARTICULARLY CAPS FOR CLOSING CONTAINERS

(75) Inventor: Zeno Zuffa, Borgo Tossignano (IT)

(73) Assignee: Sacmi Cooperativa Meccanici Imola S.c.r.l., Imola (IT)

( * ) Notice: Subject to any disclaimer, the term of this patent is extended or adjusted under 35 U.S.C. 154(b) by 0 days.

(21) Appl. No.: 09/492,755

(22) Filed: Jan. 27, 2000

(30) Foreign Application Priority Data

Nov. 2, 1999 (IT) .......................................... BO99A0583

(51) Int. Cl.$^7$ ............................................. B29C 33/46
(52) U.S. Cl. ........................ 425/437; 249/59; 425/547; 425/556; 425/576
(58) Field of Search ................ 425/346, 437, 425/533, 547, 552, 556, 576, 577, DIG. 58; 249/59

(56) References Cited

U.S. PATENT DOCUMENTS

| | | | | |
|---|---|---|---|---|
| 3,375,552 A | * | 4/1968 | Beck .......................... | 425/125 |
| 3,820,930 A | * | 6/1974 | Hehl .......................... | 425/534 |
| 4,020,137 A | * | 4/1977 | Lachner et al. ............. | 264/526 |
| 4,364,895 A | * | 12/1982 | Underwood ................ | 264/335 |
| 4,640,673 A | | 2/1987 | Takeda et al. .............. | 425/297 |
| 4,776,782 A | * | 10/1988 | Murayama et al. ......... | 425/149 |
| 5,670,100 A | * | 9/1997 | Ingram ....................... | 264/40.5 |
| 5,786,079 A | * | 7/1998 | Alieri ......................... | 425/349 |
| 6,390,800 B1 | * | 5/2002 | Brown et al. ........... | 425/436 R |

FOREIGN PATENT DOCUMENTS

| | | |
|---|---|---|
| EP | 0 654 335 | 5/1995 |
| WO | 96 09153 | 3/1996 |
| WO | WO-9609153 A1 * | 3/1996 |

* cited by examiner

Primary Examiner—W. L. Walker
Assistant Examiner—Emmanuel Luk
(74) Attorney, Agent, or Firm—Guido Modiano; Albert Josif; Daniel O'Byrne

(57) ABSTRACT

A device for manufacturing, in particular, plastic caps for closing containers, comprising molding units, each of which is composed of a male mold part and of a female mold part. The male mold part has a punch which is directly provided with compressed air which exits through ports, so as to cause the separation of the cap from the punch and facilitate the removal of the cap.

15 Claims, 6 Drawing Sheets

DEVICE FOR MANUFACTURING PLASTIC ITEMS PARTICULARLY CAPS FOR CLOSING CONTAINERS

BACKGROUND OF THE INVENTION

The present invention relates to a device for manufacturing plastic items, particularly caps for closing containers.

Devices for the compression molding of caps (closures) for closing containers are known which comprise a carousel which can rotate about a vertical axis and whereon a plurality of angularly equidistant molding units are fitted. Each unit comprises an upper male mold part which is aligned with a lower female mold part. During the rotation of the carousel, a dose of plastic material in the pasty state is introduced in the female mold part and is pressed by means of a mutual movement of the two mold parts. Devices of the described type are known for example from PCT/EP95/03644 by the same Applicant.

In devices of the indicated type it is also known to provide, in the upper mold part, cooling means which are meant to cool the forming punch and ejection means which remove the cap once molding has been completed.

In order to ensure removal of the cap from the forming punch, the mechanical ejecting action applied to the caps is assisted by a pneumatic action applied by injecting compressed air inside the caps; said air, by inflating the caps, separates them from the surface of the punch, improving the effectiveness of the mechanical action.

Currently, the pneumatic action is not utilized advantageously owing to the fact that the compressed air, in its path leading to the ports for injection inside the cap, must pass through many interstices and cavities which reduces its effectiveness and delay its action on the caps. In order to obviate these drawbacks, i.e., recover promptness in intervention and increase the flow-rate of the air, it is necessary to provide high pressure values, with consequent difficult management of the effects on the product, such as deformations and unevenness of the walls.

Moreover, the pneumatic action, as conceived in current devices, contaminates the molded item, since the conveyed air entrains particles of the fluid used to lubricate the moving parts of the upper mold part. A further drawback is constituted by the fact that the moving parts of the upper mold part produce a "piston" effect which often produces unintended movements of some mechanical components.

Differently from compression-molding devices, injection-molding devices expel the items mainly by mechanical methods and therefore with a high risk of damaging the products.

SUMMARY OF THE INVENTION

The aim of the present invention is to improve the operation of devices of the described type, substantially obviating the above described shortcomings and allowing assured removal of the items from the mold.

This aim is achieved with an apparatus whose characteristics are defined in the appended claims.

BRIEF DESCRIPTION OF THE DRAWINGS

Further characteristics and advantages of the present invention will become apparent from the following detailed description of a preferred embodiment, illustrated only by way of non-limitative example in the accompanying drawings, wherein.

DESCRIPTION OF THE PREFERRED EMBODIMENTS

Figure 1:
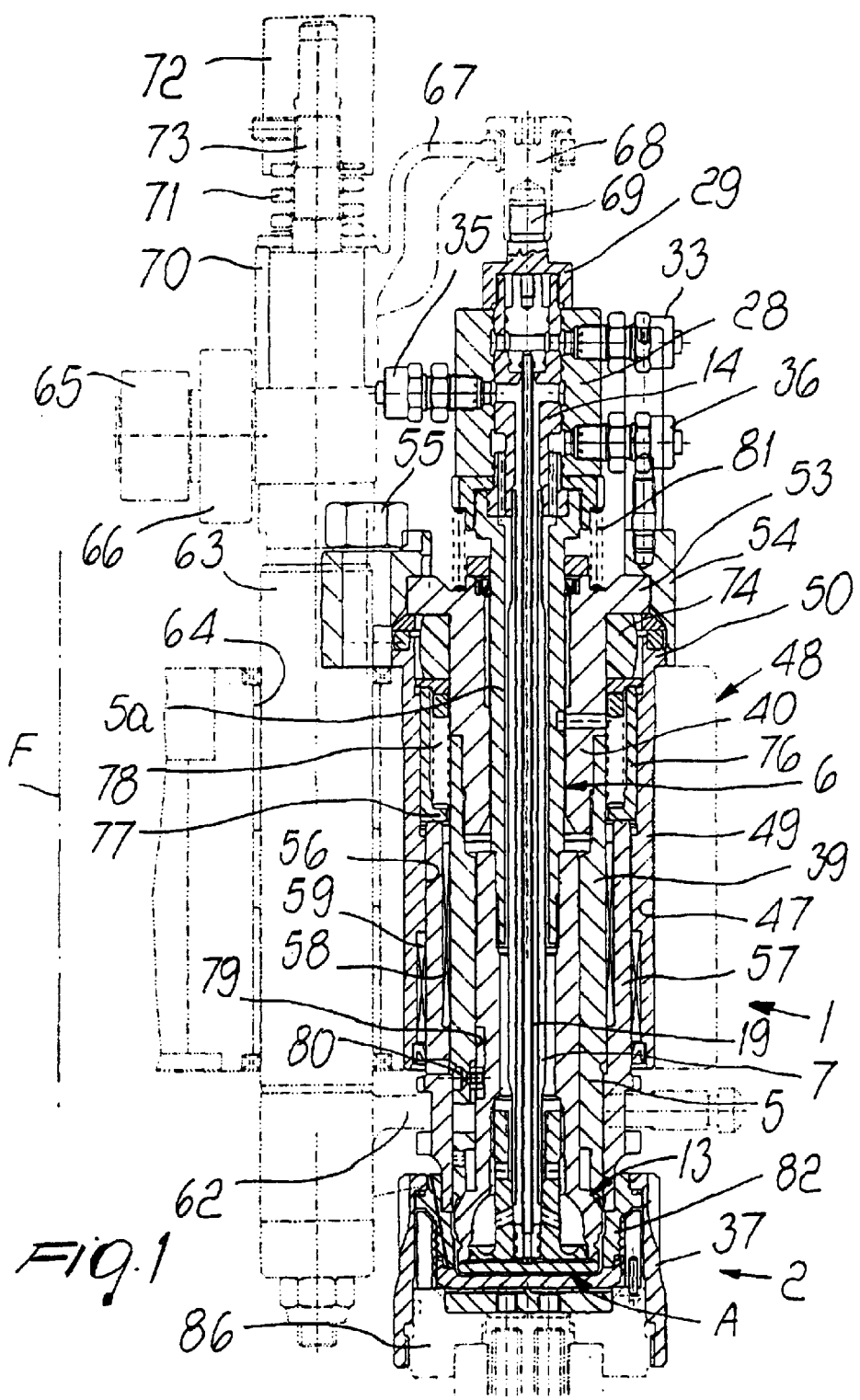
FIG. 1 is a sectional elevation view of a compression-molding unit, taken along a vertical plane, for forming a screw cap with a tamper-evident ring.
Figure 2:
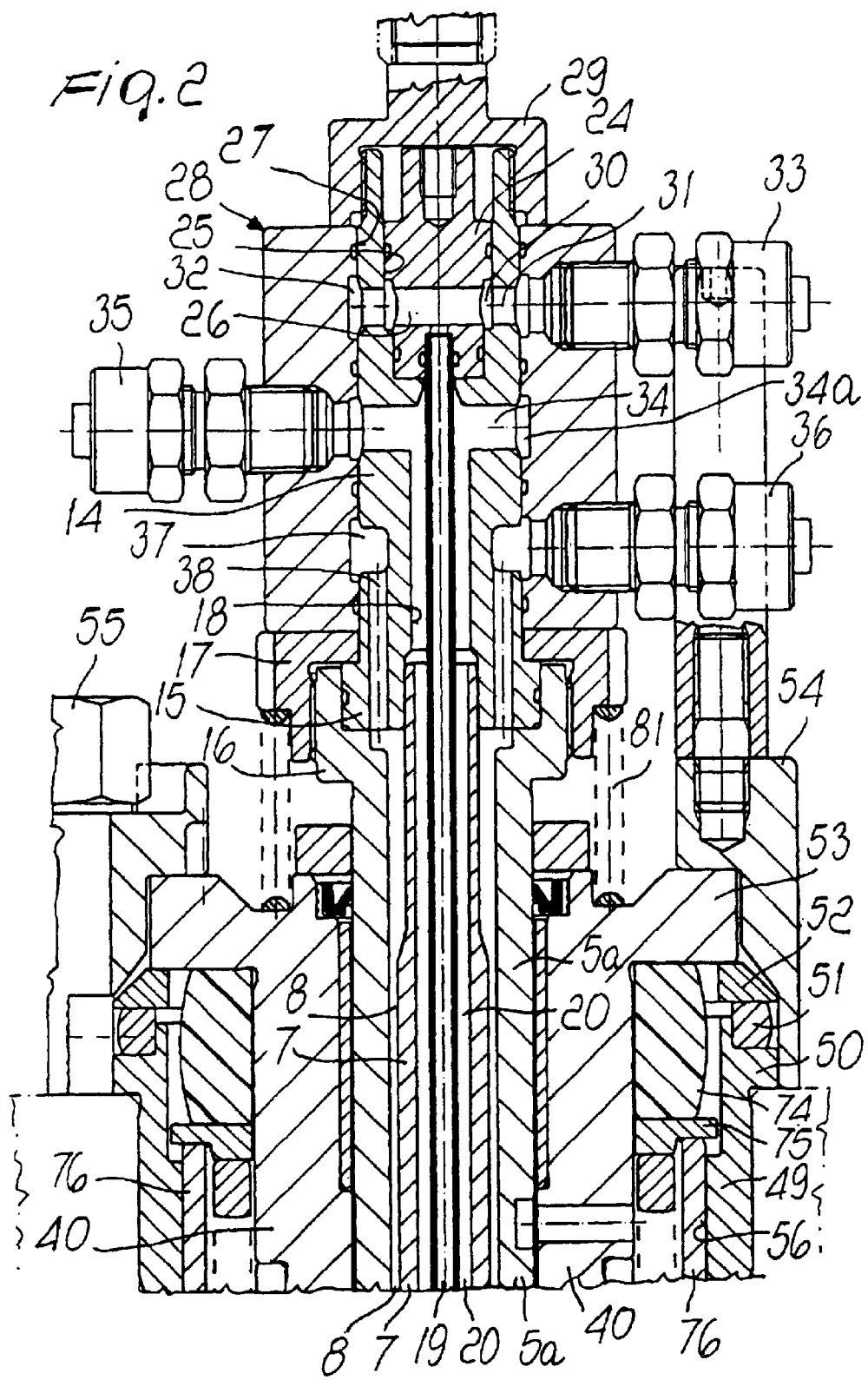
FIG. 2 is an enlarged-scale view of the upper half of the unit shown in FIG. 1.
Figure 3:
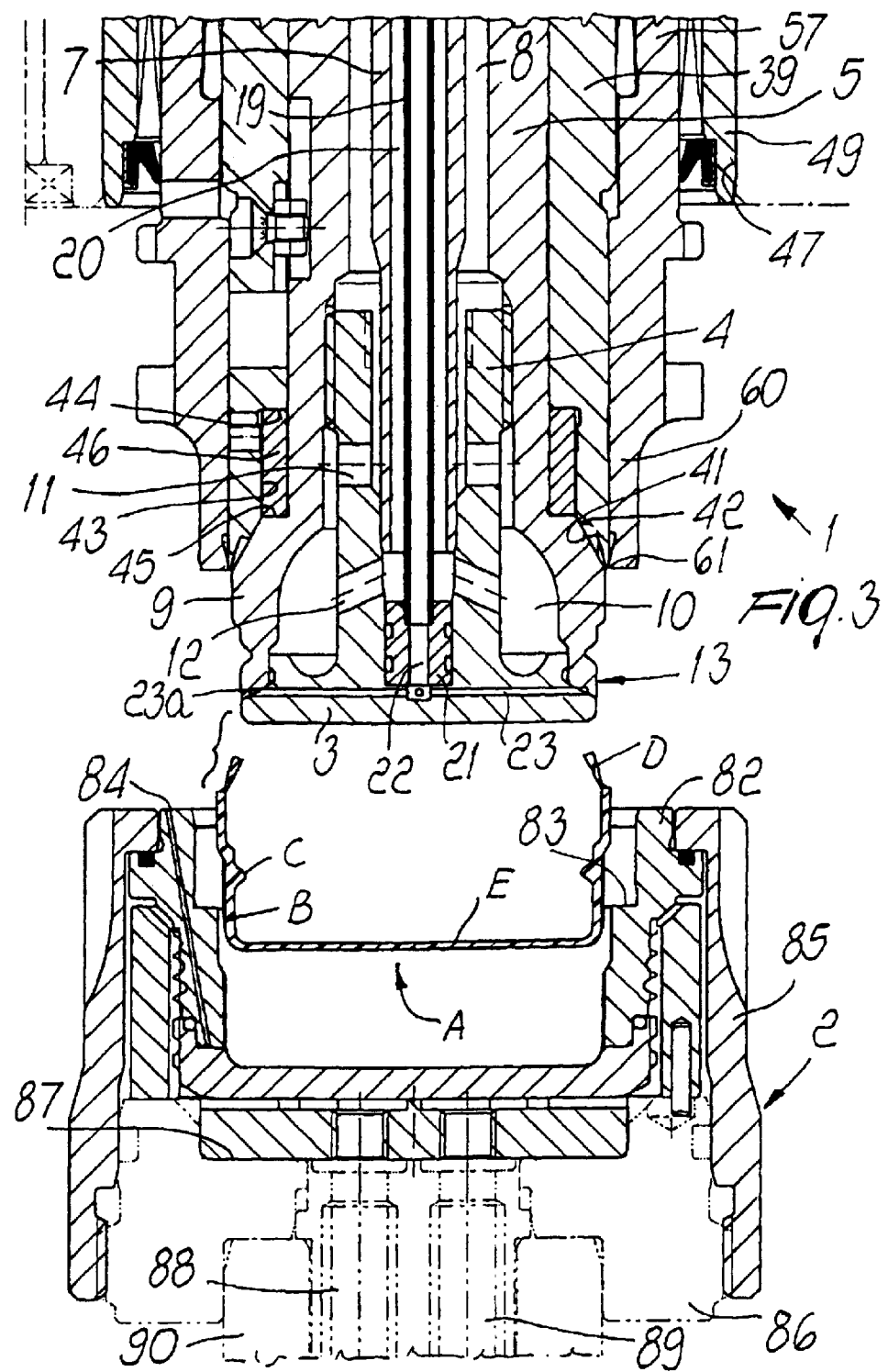
FIG. 3 is an enlarged-scale view of the lower half of the unit shown in FIG. 1, with the mold open.

With reference to FIGS. 1 to 3, the device is constituted by a carousel which can rotate about a vertical axis and peripherally supports a plurality of units for molding caps (closures) A made of plastics (see FIG. 3). Hereinafter, it is assumed that said caps A are composed of a cup B provided with an internal thread C and with an annular band D which protrudes from the rim of the cup and constitute the tamper-evident ring capable of detecting any tampering with the closure.

Each unit is composed of an upper mold part, generally designated by the reference numeral 1, and by a lower female mold part, generally designated by the reference numeral 2.

The male mold part 1 comprises a plate 3 which is screwed into a sleeve 5 by means of a tubular tang 4; in turn, said sleeve is screwed to the lower end of a tubular element 5a so as to form a single tubular stem 6 (FIG. 1).

A tube 7 is hermetically inserted in the tubular tang 4 and forms, together with the tubular stem 6 (i.e., with the sleeve 5 and the tubular element 5a), a tubular interspace 8. The sleeve 5 has, at its lower end, a bell-shaped: flared portion 9 which is centered hermetically on the plate 3 and which forms, with the tubular tang 4, a chamber 10 which is connected to the interspace 8 through openings 11 of the tubular portion. Furthermore, the chamber 10 is connected to the inside of the tube 7 through openings 12 formed in the region of the tang 4 directly above the plate 3.

The bell-shaped portion 9 of the sleeve 5 and the plate 3 form the forming punch 13, which produces, inside the cap A, the ridge of the thread C, the bottom E and the annular tamper-evident ring D, which in the example is constituted by a ring which is folded along radial planes and tapers upward, forming an obtuse angle with the cylindrical wall of the cup B. The tamper-evident ring D, in a separate step of production, is rendered detachable from the cup B by a perimetric fracture line which allows it to separate when the cap is unscrewed from the container to which it has been applied. It should be noted that before application to the container the ring D is tucked inside the cap so as to delimit an acute angle together with the wall of the cup and so as to be able to engage against a retention collar formed on the neck of the container directly below the region where the screw coupling of the cap occurs.

The upper end of the tube 7 is hermetically connected in a seat of a cylindrical body or insert 14 provided with an external collar 15, by means of which it is centered in a seat formed by a wider portion 16 of the upper end of the tubular element 5a of the tubular stem 6. The body 14 is locked on the stem 6 by a ring 17 which is screwed onto the wider portion 16 and acts on the collar 15.

A hole 18 is formed in the body 14, is coaxial to the tube 7 and is connected to the inside of said tube. A slender tube 19 runs coaxially through the hole 18 and the tube 7 and internally delimits, together with the tube 7 and the hole 18, a tubular channel 20.

The lower end of the slender tube 19 is inserted hermetically in a bush 21 (FIG. 3) which is in turn hermetically inserted in the bottom of the tang 4. The slender tube 19 is connected, through the axial hole 22 of the bush 21, to a series of holes 23 which are formed radially in the thickness of the plate 3 and open radially onto the outside of the punch 13 through ports 23a constituted by passages formed in the region for centering the bell-shaped portion 9 between the rim thereof and the plate 3.

The upper end of the slender tube 19 is inserted hermetically in a cylinder 24 (FIG. 2) which is accommodated in a recess 25 formed at the top of the body 14 and is connected to a diametrical hole 26 of the cylinder 24.

The body 14 is inserted in a seat 27 of a cylindrical element or sleeve 28 whose height is such that the body 14 protrudes, with a threaded portion, from the upper face of said cylindrical element. A cap 29 is screwed onto said threaded portion and secures the cylindrical element 28 against the ring 17.

The diametrical hole 26 is connected, by means of an internal annular slot 30, of holes 31 of the body 14 and of an annular slot 32 located externally with respect to the body 14, to a coupling 33 which is connected to a compressed air source. In this way, the compressed air, conveyed through the coupling 33, after flowing through the slender tube 19, reaches the holes 23 and can exit radially from the punch 13 through the passages 23a formed between the rims of the plate 13 and of the bell-shaped portion 9.

In the body 14, below the recess 25, there is a diametrical hole 34 which leads into an annular slot 34a of the cylindrical element 28 which surrounds the body 14 and is connected to a coupling 35 for supplying a coolant fluid. A similar coupling 36 is arranged a lower level than the coupling 35 and is connected, by means of an annular slot 37 of the body 14 and a plurality of holes 38 which run coaxially from the slot 37 through the collar 15, to the interspace 8 and to the chamber 10 through the openings 12. This forms a connection between the couplings 35 and 36 which allows recirculation of the coolant fluid.

The sleeve 5 is slidingly guided in a cylindrical jacket 39 which is rigidly coupled, by means of a screw coupling, to a tubular element 40 in which the stem 6 slides.

The lower rim of the jacket 39 is internally provided with a conical bevel 41 (FIG. 3) which is arranged axially opposite a complementary conical bevel 42 by means of which the bell-shaped portion 9 is connected to the sleeve 5. The bevel 41 acts as a shoulder for the bevel 42.

Inside the lower end portion of the jacket 39 an annular recess 43 is provided which forms a step 44. A similar step 45, arranged axially opposite the step 44, is formed between the conical bevel 42 and the sleeve 5. The seat that remains between the steps 44, 45 and the opposite cylindrical surfaces of the sleeve 5 and of the jacket 39 accommodates a spacer ring 46 which acts as a shoulder and whose dimensions are chosen so that during molding it forms, between the bevels 41 and 42, a cavity which is meant to form the tamper-evident ring.

The jacket 39 and the element 40 are coaxial to a respective cylindrical seat 47 of a supporting body which is part of the structure of the carousel. In practice, said body is constituted by a sort of rotating drum 48 which is mounted on a vertical shaft whose axis F is the rotation axis of the carousel.

A bush 49 is inserted in the seat 47 and rests, by means of an annular lip 50, on the upper edge of the seat 47.

A spacer ring 52 rests on the lip 50, with a ring 51 of elastic material interposed; the tubular element 40 in turn rests on said spacer ring by means of an external flange 53.

A locking element 54 engages the flange 53 and locks, by means of screws 55, on the upper face of the drum 48, the tubular element 40 and the bush 49 coaxially to each other and to the seat 47.

A cylindrical chamber 56 remains between the bush 49 and the outer surface of the jacket 39 and of the element 40, and a sleeve 57 protrudes therein from below and is guided axially on the jacket 39 by an internal bearing 58 and in the bush 49 by an external bearing 59.

The sleeve 57 ends, at the level of the bell-shaped portion 9, with a collar 60 whose internal edge is designated by the reference numeral 61. The collar 60 has an inside diameter which is larger than the outside diameter of the bell-shaped portion 9, so as to form, in the molding position, an interspace for forming the cylindrical wall of the cup.

The sleeve 57 is rigidly connected, by means of an arm 62, to a column 63 which is parallel thereto. The column 63 is guided in a seat 64 of the drum 48 and supports in a cantilevered manner, at the top, two rollers 65, 66 which follow a circular cam (not shown in the drawing) which is rigidly coupled to the structure of the apparatus and is therefore stationary and lies concentrically to the rotation axis F of the carousel. The end of an arm 67 is applied to the top of the column 63; the opposite end of said arm is fixed, by means of a nut 68, to the threaded tang 69 of the cap 29. The end of the arm 67 that is applied to the column 63 is provided with a bush 70 whereon a spring 71 acts, pushing it against a shoulder of the column. The spring 71 abuts against a nut 72 which is adjustably screwed onto an end stem 73 of the column which protrudes upward.

The stationary cam, by means of the column 63, provides positive actuation of the movements of the sleeve 57 only through an angle which is sufficient to remove the cap from the punch 13; through the remaining angle of rotation, the sleeve 57 can move upward in contrast with elastic abutment means.

Said means are constituted by a spring 74 which is interposed between the flange 53 of the tubular element 40 and a swivel ring 75 which rests on a tubular case 76 which is accommodated in the cylindrical chamber 56. The case 76 has an internal lip 77 whereon a cylindrical spring 78 rests, said spring being adapted to act against the swivel ring 75.

In order to prevent the sleeve 5 from rotating with respect to the jacket 39, externally with respect to the sleeve 5 there is an axial slot 79 in which a key 80 which protrudes inward from the jacket 39 is slidingly engaged.

The upper mold part 1 is completed by a spring 81 which is interposed between the flange 53 of the tubular element 40 and the ring 17. The spring 81 actuates upward the stem 6 and therefore the punch 13, keeping it in a stop position which is determined by the abutment of the ring 46 against the step 44 of the jacket 39 at which contact occurs between the complementary conical surfaces of the bevels 42 and 41 of the punch 13 and of the jacket 39, respectively.

The lower mold part 2 is composed of a cup-shaped portion 82 which forms a cavity which allows the insertion of the annular segment 60 until the abutment of a shoulder 83 occurs and the cap forming chamber closes. In the wall of the cup-shaped portion 82 there are holes 84 which keep the cavity of the cup-shaped portion connected to the outside in order to allow venting of the air which has remained trapped in the mold during molding.

The cup-shaped element 82 is locked, by means of an external ring 85, against a disk 86 with which it forms a chamber 87 which is connected to an intake duct 88 and a discharge duct 89 for a cooling liquid.

The ducts 88, 89 run inside a hollow stem 90 whereon the disk 86 is fitted. The hollow stem 90 is guided in the structure of the device coaxially to the punch 13 and is actuated by a respective hydraulic actuator so as to move the cup-shaped element 82 toward and away from the punch 13.

The operation of the described device is as follows. During molding and while the lower mold part is spaced from the upper one, a preset dose of product in the pasty state is deposited in the cavity of the cup-shaped element 82. During this step, the edge 61 of the annular segment 60 of the sleeve 57 is at a level which lies below the plate 3 of the punch.

By means of the hydraulic lifting of the female mold part 2, the segment 61 abuts against the shoulder 83 of the cup-shaped element and the cap forming chamber, which remains formed between the punch 13 and the cup-shaped element 82, closes.

Then, as a consequence of the pressure applied from below onto the cup-shaped element 82, the plastic material is gradually distributed in the forming chamber until it also enters the annular space for forming the tamper-evident ring, which is formed between the conical bevels 41 and 42. When the forming cavity has been filled, due to the incompressibility of the plastic material the cup-shaped element 82 stops in the final position, in which the edge 61 of the segment 60 is at the level of the angle formed by the conical surface of the shoulder 42 with the cylindrical surface of the portion 9 of the punch 13 and therefore above the rim of the cup B from which the retention ring D protrudes. The setting point of the plastic material is determined by feeding the coolant liquid into the chamber 10 through the delivery coupling 35, the annular slot 34*a*, the hole 34 and the tubular channel 20 and by draining the liquid toward the return coupling 36 through the openings 12, the interspace 8, the axial holes 38 and the annular slot 37.

For some applications it might be useful and convenient to reverse the delivery and the return of the coolant liquid.

When the chosen setting point has been reached, the descent of the cup-shaped element 82 is actuated. However, despite the spacing of the two mold parts 1 and 2, the cap does not fall; it remains attached to the punch due to the internal undercuts constituted by the thread C.

When the cup-shaped element 82 has disengaged from the cap, compressed air is conveyed through the coupling 33, the annular slot 32, the holes 31, the slot 30, the hole 26, the slender tube 19, the holes 22 and 23 and the ports 23*a*, separating the cap from the punch by slightly inflating said cap and allowing, when the column 63 is actuated so as to descend by the stationary cam which actuates the rollers 65 and 66, the cap to separate from the punch by virtue of the axial thrust applied by the edge 61 to the rim of the cap to which the tamper-evident ring is joined.

The separation of the cap is due to the elastic properties of the material, which allows a widening of the cup B and, as soon as the cap has been extracted from the punch, the recovery of the original shape so that the tamper-evident ring converges toward the axis of the cap.

Meanwhile, the carousel has turned into a position in which the removed cap falls onto a removal chute. The described cycle is repeated, during the rotation of the carousel, for each one of the molding units.

In practice, by providing a carousel with 32 molding units, the cap cooling step covers approximately 315°, whereas insertion of the dose of plastic material in the cavity of the cup-shaped element 82, molding and extraction of the cap are performed over the remaining 45°.

The caps A are subjected to subsequent processes at the output of the device. In particular, with the illustrated type of cap, provisions are made for producing slits which form the fracture line along which the tamper-evident ring is separated from the cup B and the tamper-evident ring folds back into the cup so that the tamper-evident ring, once applied to a container, can act edgeways on a collar of the container and withstand traction during unscrewing until the ring fractures.

It is evident that the invention perfectly achieves the intended aim. According to the main feature, between the punch 13 and the compressed air delivery coupling 33 there is a direct connection which reduces its intervention times, allowing higher profitability of the device. Moreover, the air stream does not pass between lubricated parts and therefore does not entrain particles of lubricant or the like which, expelled from the ports 23*a* between the plate 3 and the bell-shaped portion 9, might deposit onto the manufactured caps and contaminate them.

From the point of view of manufacture, the adoption of the cylindrical element 28 has proved itself particularly advantageous: it allows to centralize three separate services, i.e., the deliveries of the coolant liquid and of the compressed air and the return of the coolant.

Figure 4:
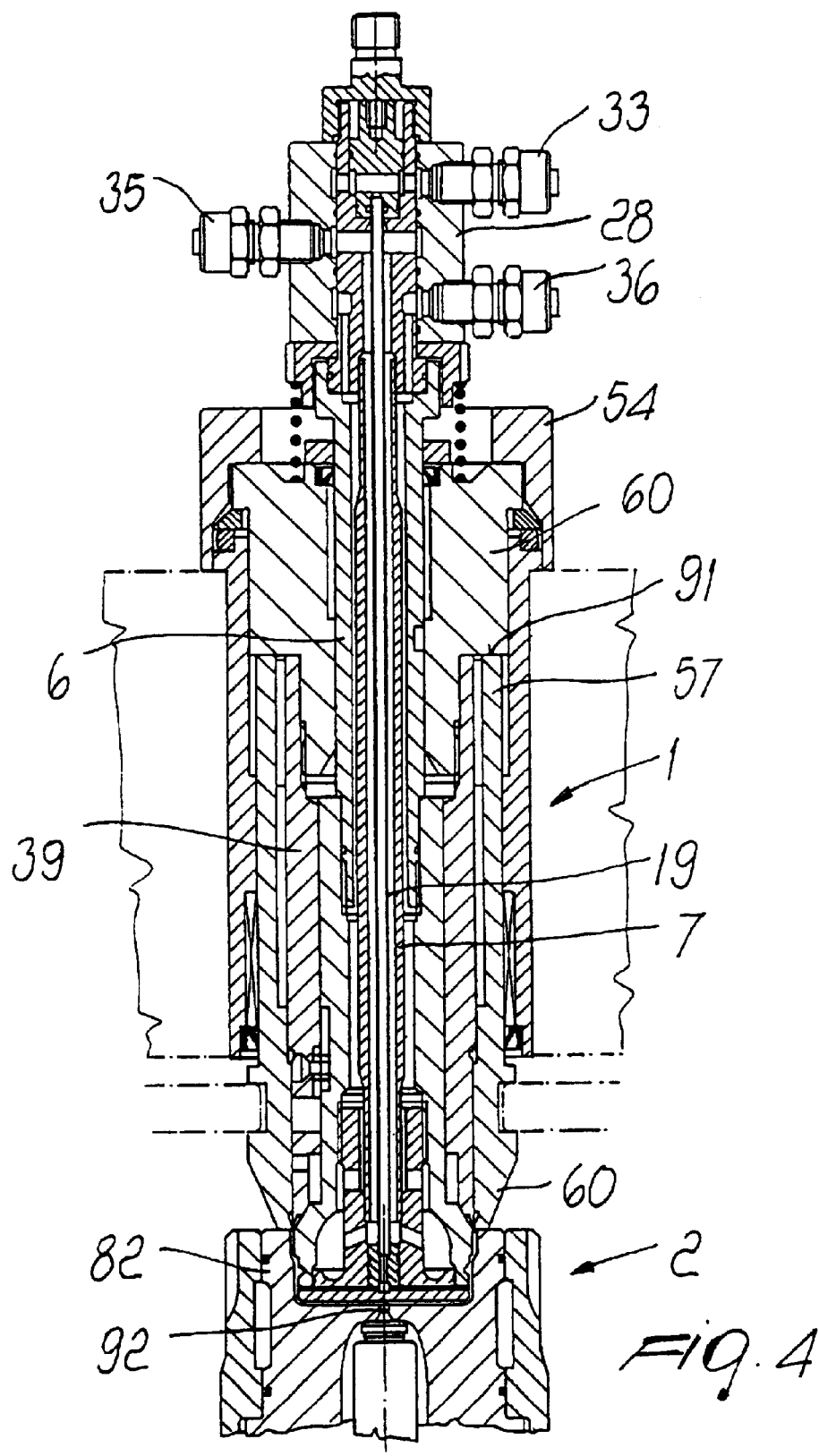
FIG. 4 is an elevation view of an injection-molding unit, taken along a vertical plane, for forming a screw cap with tamper-evident ring.

FIG. 4 illustrates an embodiment in which the inventive concept is applied to a device for manufacturing caps by means of injection-molding units, whose only differences with respect to the units of the device of FIGS. 1–3 relate to the absence of the elements 74 to 78, in order to allow the abutment of the sleeve 57 directly against a shoulder 91 of the tubular element 40, and the presence in the bottom of the cup-shaped element 82 of a nozzle 92 for injecting the plastic material.

When the two mold parts 1 and 2 have been placed mutually adjacent, the rim of the cup-shaped element 82 abuts against the rim of the collar 60, and between the internal wall of the cup-shaped element 82 and the external wall of the punch 13 there remains a chamber whose shape is exactly the same as the shape of the cap to be formed; said chamber is filled with plastic material which is injected under pressure through the nozzle 92. The setting of the plastic material and the removal of the cap after opening the mold parts 1 and 2 occur as in the device of FIGS. 1 to 3.

The invention is susceptible of numerous modifications and variations, all of which are within the scope of the inventive concept. One of these embodiments uses a coupling 33 which has a valve provided with a flow control element controlled by the movement of the sleeve 28.

Figure 5:
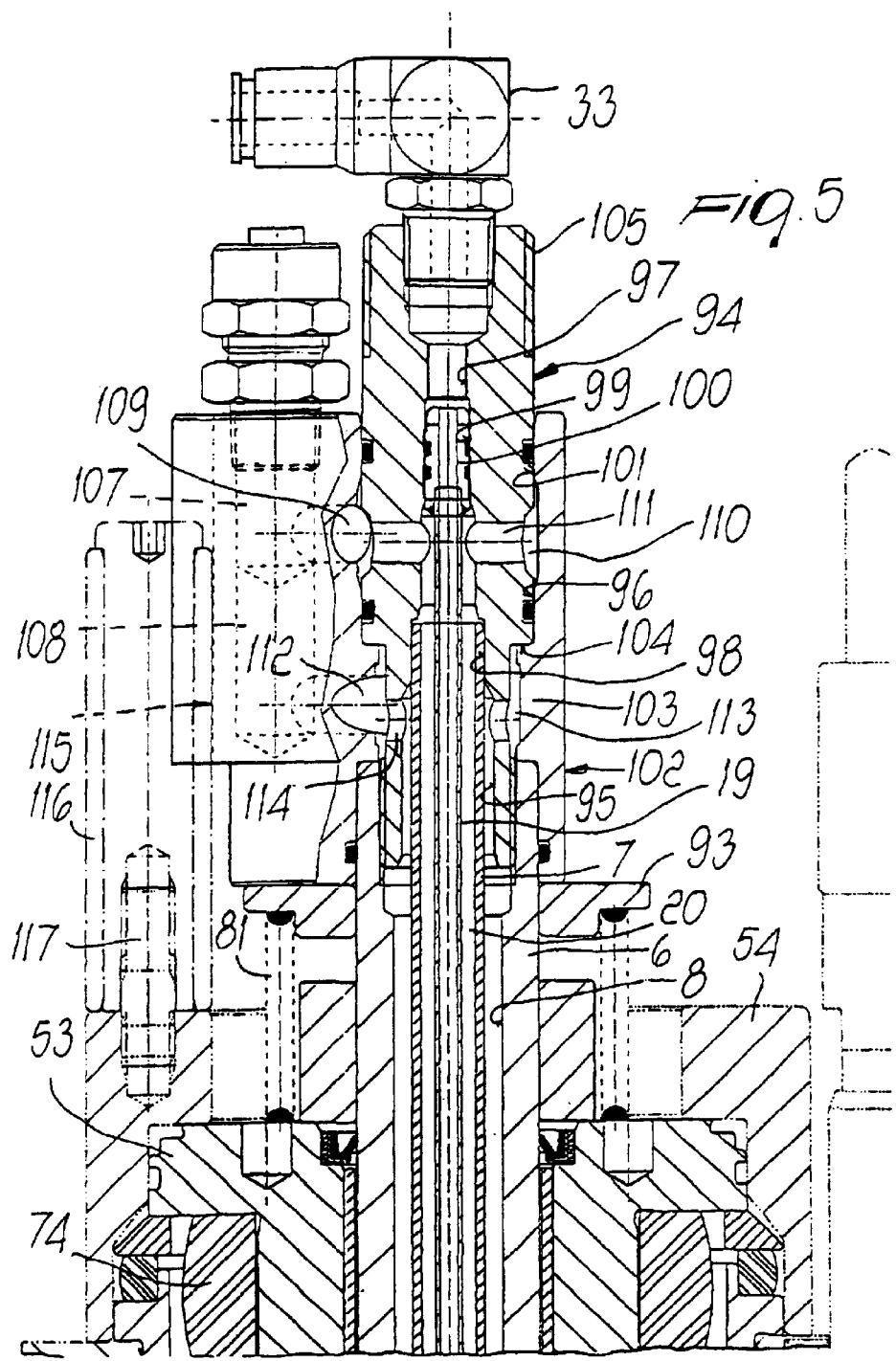
FIGS. 5 and 6 are a sectional view and a plan view of the upper part of a molding unit.
Figure 6:
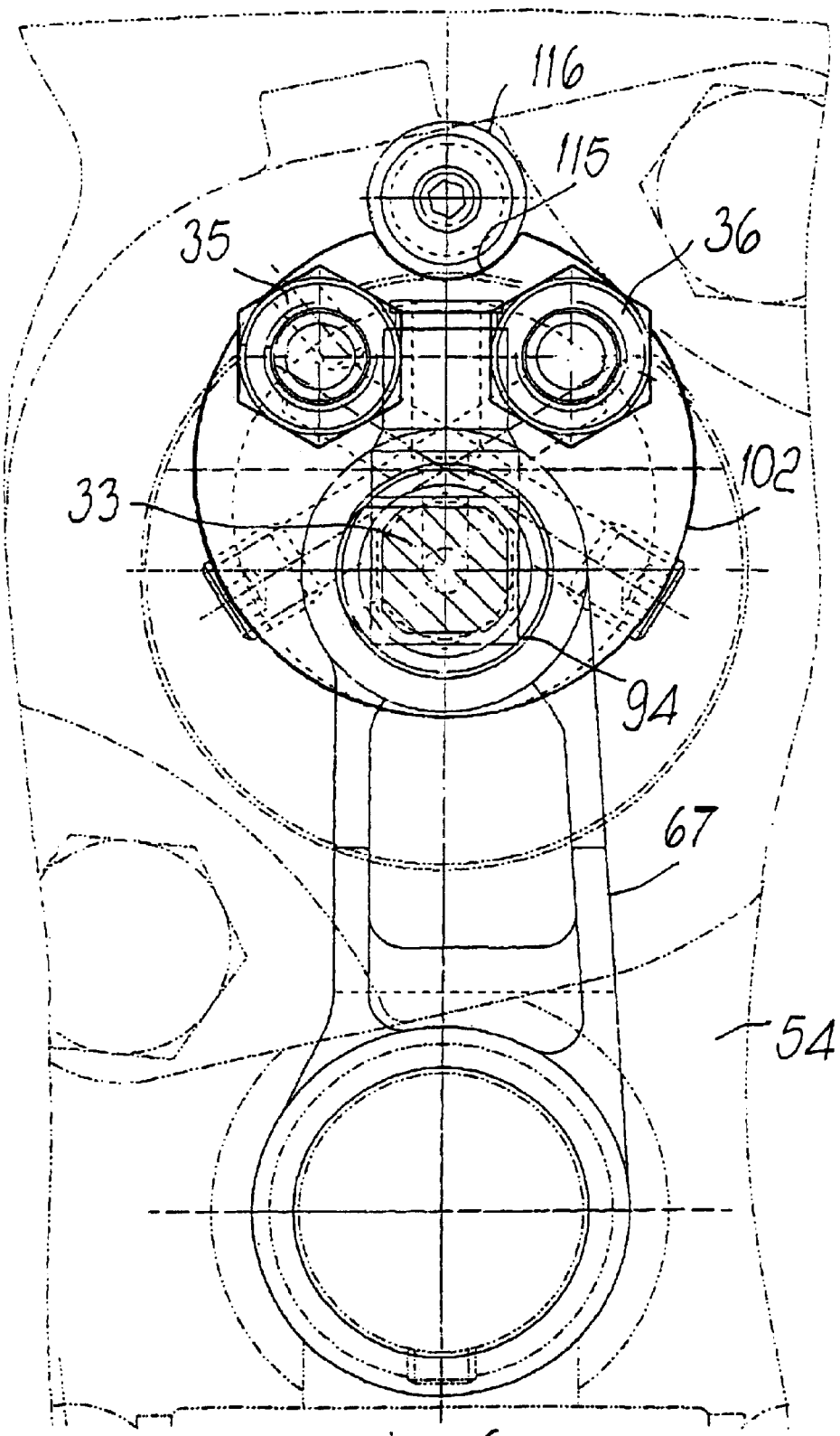

A further embodiment of the invention is shown in FIGS. 5 and 6 and relates to the connection of the tubular interspace 8 and of the tubular channel 20 to the supply of the coolant fluid and the connection of the slender tube 19 to the compressed air supply.

In FIGS. 5 and 6, elements or parts which are constructively different but functionally equivalent to those of the device of FIGS. 1 and 3 are designated by the same reference numerals.

It is easy to recognize the tubular stem 6 which protrudes, with the upper tubular portion, above a flange 93 which can slide thereon and acts as a support for the spring 81.

The upper end portion is internally threaded for the screwing of a cylindrical insert 94 which is equivalent to the integration of the parts 14 and 24 of the device of FIGS. 1–3. The insert 94 is axially crossed by a hole which is composed of a plurality of portions 95, 96 and 97 which decrease in diameter and between which two seats 98 and 99 are formed.

The tops of the tube 7 and, respectively, of a bush 100 which is fixed to the end of the slender tube 19 are inserted hermetically in the seats 98 and 99.

The cylindrical insert 94 is accommodated in a seat 101 which is formed eccentrically in a cylindrical element 102 which is provided with an internal collar 103. When the insert 94 is screwed into the stem 6, the collar 103 remains locked between a shoulder 104 which is internal to the insert 94 and the upper rim of the stem 6.

The insert 94 has an upper threaded portion 105 which protrudes above the upper face 106 of the element 102. The radial arm 67, which connects the insert to the column 63, and the coupling 33 for connecting the hole 97 to the compressed air supply are fixed to said portion 105; accordingly, said compressed air, by means of the slender tube 19, can be conveyed directly to the discharge ports 23a of the forming punch 13.

Two parallel dead holes 107, 108 are formed in the element 102 and lead onto the face 106; the two couplings 35, 36 connected to the delivery and the return of the coolant fluid are screwed into said holes.

The hole 107 is connected to the tubular channel 20 by means of a radial hole 109 of the element 102, an annular slot 110, radial holes 111 and the portion 96 of the insert 94. Likewise, the hole 108 is connected to the cylindrical interspace 8 by means of the radial hole 112 of the element 102, the slot 113, the radial holes 114 and the portion 95 of the insert 94, so that the coolant fluid can be conveyed into the chamber 10 of the punch and can drain out of it.

In order to avoid the rotation of the element 102 and of the parts rigidly coupled thereto, in the peripheral region of the element 102, between the two dead holes 107, 108, there is a slot 115 in which a column 116 engages; said column is fixed to the element 54 by means of a screw 117. The slot 115 and the column 116 are parallel to the stem 6 in order to allow axial movements thereof but prevent its rotation.

The substantial advantage of the variation of FIGS. 5 and 6 is the vertical arrangement of the couplings 33, 35 and 36, which facilitates the connections to the coolant fluid and compressed air supplies and allows constructive simplification.

In the practical embodiment of the invention, the male mold part 1 and the female mold part 2 can be structured so as to allow any form of cap, with or without tamper-evident ring.

The disclosures in Italian Patent Application No. BO99A000583 from which this application claims priority are incorporated herein by reference.

What is claimed is:

1. A device for manufacturing items made of plastic material, with molding units arranged on a structure of carousel which rotates about a first vertical axis, the device including an upper male mold part and a lower female mold part which are aligned along a second vertical axis, parallel to said first vertical axis of the carousel, said male mold part comprising: a cylindrical jacket which is rigidly coupled to the structure of the rotating carousel coaxial to a sliding axis of the female mold part; a sleeve which is guided on said jacket; and a forming punch which is guided in said jacket and comprises a tabular stem, said tubular stem having a lower portion forming a chamber, said lower portion being constituted by a plate fixed to said stem and having a thickness and an outer surface which is shaped so as to produce internal molding of a molded item, said plate including a series of radial holes which are formed radially in the thickness of said plate, and ports provided at said outer surface and connected to said radial holes, said radial holes and said ports being supplied with compressed air; a tube accommodated inside said stem, said tube forming, together with said stem, a cylindrical interspace which is connected to said chamber; a slender tube arranged internally along said tube and connected hermetically to said plate in communication with said radial holes and said ports, said slender tube forming, together with said tube, a tubular channel, said tubular channel being connected to said chamber; and coolant fluid delivery and return couplings, said cylindrical interspace and said tubular channel being connected to said coolant fluid delivery and return couplings, and said slender tube being supplied with, and further conveying compressed air through said radial holes and said ports between said outer surface and the molded item, so as to cause the separation of said item from said lower portion of said tubular stem.

2. The device of claim 1, wherein said plate is centered at a flared region of said stem and is provided with a tubular tang which is screwed into said stem so as to form said chamber, and wherein lower ends of said tube and of said slender tube are inserted hermetically in said tang so as to close said cylindrical interspace and said tubular channel, said cylindrical interspace and said tubular channel being connected to said chamber through openings provided at said tang.

3. The device of claim 2, comprising: a body coupled to an upper end of said stem, upper ends of said tube and of said slender tube being inserted hermetically in said body; and holes being formed in said body in order to connect said cylindrical interspace and said tubular channel to said coolant fluid delivery and return couplings and to allow supplying of compressed air to said slender tube.

4. The device of claim 3, further comprising an element which is fixed to a top part of said stem, said element being provided with couplings for connection to said holes, and accommodating said body which has a cylindrical form.

5. The device of claim 4, comprising elastic means, which are interposed between said element and the structure of the carousel for returning said stem into a position in which said punch rests against a shoulder of said jacket.

6. A device for manufacturing caps of plastic material for closing containers, with molding units arranged on a structure of carousel which rotates about a first vertical axis, the device including an upper male mold part and a lower female mold part which are aligned along a second vertical axis, parallel to said first vertical axis of the carousel, said male mold part comprising: a cylindrical jacket which is rigidly coupled to the structure of the rotating carousel coaxial to a sliding axis of the female mold part; a sleeve which is guided on said jacket; and a forming punch which is guided in said jacket and comprises a tubular stem, said tubular stem having a lower potion forming a chamber, said lower portion being constituted by a plate fixed to said stem and having a thickness and an outer surface which is shaped so as to produce internal molding of a molded item, said plate including a series of radial holes which are formed radially in the thickness of said plate, and ports provided at said outer surface and connected to said radial holes, said radial holes and said ports being supplied with compressed air; a tube accommodated inside said stem, said tube forming, together with said stem, a cylindrical interspace which is connected to said chamber; a slender tube arranged internally along said tube and connected hermetically to said plate in communication with said radial holes and said ports, said slender tube forming, together with said tube, a tubular channel, said tubular channel being connected to said chamber; and coolant fluid delivery and return couplings, said cylindrical interspace and said tubular channel being connected to said coolant fluid delivery and return couplings, and said slender tube being supplied with, and further conveying compressed air through said radial holes and said ports between said outer surface and the molded item, so as to cause the separation of said item from said lower portion of said tubular stem.

7. The device of claim 6 wherein said plate is centered at a flared region of said stem and is provided with a tubular tang which is screwed into said stem so as to form said chamber, and wherein lower ends of said tube and of said slender tube are inserted hermetically in said tang so as to close said cylindrical interspace and said tubular channel, said cylindrical interspace and said tubular channel being connected to said chamber through openings provided at said tang.

8. The device of claim 7, comprising: a body coupled to an upper end of said stem, upper ends of said tube and of said slender tube being inserted hermetically in said body; and holes being formed in said body in order to connect said cylindrical interspace and said tubular channel to said coolant fluid delivery and return couplings and to allow supplying of compressed air to said slender tube.

9. The device of claim 8, comprising an element which is fixed to a top part of said stem, said element being provided with couplings for connection to said holes, and accommodating said body which has a cylindrical form.

10. The device of claim 9, comprising elastic means, which are interposed between said element and the structure of the carousel for returning said stem into a position in which said punch rests against a shoulder of said jacket.

11. A device for manufacturing item made of plastic material, with molding units arranged on a structure of carouse which rotates about a first vertical axis, the device including upper male mold part and a lower female mold part which are aligned along a second vertical axis, parallel to said first vertical axis of the carousel, said male mold part comprising: a cylindrical jacket which is rigidly coupled to the structure of the rotating carousel coaxial to a sliding axis of the female mold part; a sleeve which is guided on said jacket; and a forming punch which is guided in said jacket and comprises a tubular stem, said tubular stem having a lower portion forming a chamber, said lower portion further including a plate fixed to said stem and having a thickness and an outer surface which is shaped so as to produce internal molding of a molded item, said plate including a series of radial holes which are formed radially in the thickness of said plate, and ports provided at said outer surface and connected to said radial holes, said radial holes and said ports being supplied with compressed air; a tube accommodated inside said stem, said tube forming, together with said stem, a cylindrical interspace which is connected to said chamber; a slender tube arranged internally along said tube and forming, together with said tube, a tubular channel, said tubular channel being connected to said chamber; and coolant fluid delivery and return couplings, said cylindrical interspace and said tubular channel being connected to said coolant fluid delivery and return couplings, and said slender tube being supplied with, and further conveying compressed air through said radial holes and said ports between said outer surface and the molded item, so as to cause the separation of said item from said lower portion of said tubular stem, wherein said lower portion is constituted by a plate which is centered at a flared region of said stem, said plate being provided with a tubular tang which is screwed into said stem so as to form said chamber, and wherein lower ends of said tube and of said slender tube are inserted hermetically in said tang so as to close said cylindrical interspace and said tubular channel, said cylindrical interspace and said tubular channel being connected to said chamber through openings provided at said tang, a body coupled to an upper end of said stem, upper ends of said tube and of said slender tube being inserted hermetically in said body; and holes being formed in said body in order to connect said cylindrical interspace and said tubular channel to said coolant fluid delivery and return couplings and to allow supplying of compresses air to said slender tube, an element which is fixed to a top part of said stem, said element being provided with couplings for connection to said holes, and accommodating said body which has a cylindrical form, comprising elastic means, which are interposed between said element and the structure of the carousel for returning said stem into a position in which said punch rests against a shoulder of said jacket.

12. A device for manufacturing caps of plastic material for closing materials with molding units arranged on a structure of carousel which rotates about a first vertical axis, the device including an upper male mold part and a lows female mold part which are aligned along a second vertical axis, parallel to said first vertical axis of the carousel, said male mold part comprising: a cylindrical jacket which is rigidly coupled to the structure of the rotating carousel coaxial to a sliding axis of the female mold part; a sleeve which is guided on said jacket; and a forming punch which is guided in said jacket and comprises a tubular stem, said tubular stem having a lower portion forming a chamber, said lower portion further including a plate fixed to said stem and having a thickness and an outer surface which is shaped so as to produce internal molding of a molded item, said plate including a series of radial holes which are formed radially in the thickness of said plate, and ports provided at said outer surface and connected to said radial holes, said radial holes and said ports being supplied with compressed air; a tube accommodated inside said stem, said tube forming, together with said stem, a cylindrical interspace which is connected to said chamber; a slender tube arranged internally along said tube and forming, together with said tube, a tubular channel, said tubular channel being connected to said chamber; and coolant fluid delivery and return couplings, said cylindrical interspace and said tubular channel being connected to said coolant fluid delivery and return couplings, and said slender tube being supplied with, and further conveying compressed air through said radial holes and said ports between said outer surface and the molded item, so as to cause the separation of said item from said lower portion of said tubular stem, wherein said plate is centered at a flared region of said stem, said plate being provided with a tubular tang which is screwed into said stem so as to form said chamber, and wherein lower ends of said tube and of said slender tube are inserted hermetically in said tang so as to close said cylindrical interspace and said tubular channel, said cylindrical interspace and said tubular channel being connected to said chamber through openings provided at said tang, a body coupled to an upper end of said stem, upper ends of said tube and of said slender tube being inserted hermetically in said body; and holes being formed in said body in order to connect said cylindrical interspace and said tubular channel to said coolant fluid delivery and return couplings and to allow supplying of compressed air to said slender tube, an element which is fixed to a top part of said stem, said element being provided with couplings for connection to said holes, and accommodating said body which has a cylindrical form, elastic means, which are interposed between said element and the structure of the carousel for returning said stem into a position in which said punch rests against a shoulder of said jacket.

13. A device for manufacturing plastic caps for closing containers, by means of molding units arranged on a carousel having a structure rotating about a vertical axis and comprising an upper male mold part and a lower female mold part which are aligned along a second vertical axis which is parallel to the rotation axis of the carousel, said upper male mold part comprising: a cylindrical jacket rigidly coupled to the structure of the rotating carousel, coaxial to the sliding axis of said lower female mold part; a sleeve which is guided on said jacket; a forming punch with an outer forming surface, said forming punch being guided in said jacket and comprising a tubular stem having an upper portion and a lower portion, said lower portion enclosing a chamber and having an outer surface formed by a plate fixed to said stem, said plate having a thickness and being shaped so as to produce the internal molding of said item and being provided with a series of radial holes which are formed radially in the thickness of salt plate and ports connected to said radial holes and opening at said lower surface and connected to a compressed air supply, said tubular item internally accommodating a tube which forms, together with said tubular stem, a cylindrical interspace which is connected to said chamber; a cylindrical element fixed to said upper portion of said tubular stem and having a seat coaxial to said tubular stem; a body accommodated in said seat and coupled to said upper portion of said tubular stem; a slender tube arranged internally along said tube and hermetically coupled to said plate in fluid communication with said radial holes and said ports and forming, together with said tube, a tubular channel which is connected to said chamber, said slender tube and said tube each having an upper end hermetically inserted in said body; holes formed in said body and in said cylindrical element for connecting said cylindrical interspace and said tubular channel to a delivery and a return of a coolant fluid and for connecting said slender tube to said compressed air supply so as to convey compressed air through said radial holes and said ports between the outer forming surface of said forming punch and the manufactured item, so as to cause the separation of said item from said portion.

14. A device according to claim 13 wherein said forming punch comprises a bell-shaped portion, said plate being centered to said ball-shaped portion and having a tubular tang centrally projecting therefrom and coupled to said tubular stem so as to define said chamber, a bush hermetically inserted in said tang and connected a lower end of said slender tube to said radial holes, a recess formed in said body, a cylinder accommodated in said recess coaxially to said slender tube and provided with respective holes communicating with said compressed air supply, said upper end of said slender tube being hermetically inserted in said cylinder and connected to said compressed air supply through said respective holes.

15. The device according to claim 13, further comprising elastic means which are interposed between said cylindrical element and a structure of said carousel and are suitable to return said tubular stem into a position in which said forming punch rests against a shoulder of said jacket.

\* \* \* \* \*